Aug. 21, 1945.　　M. S. MERRILL ET AL　　2,383,405
BALANCING METHOD AND APPARATUS
Filed July 27, 1940　　4 Sheets-Sheet 1

Inventors:
Claude M. Hathaway
Marcellus S. Merrill
By Whitehead & Vogl
Per Earle Whitehead
Attorneys

Inventors:
Claude M. Hathaway
Marcellus S. Merrill
By Whitehead & Vogl
Per *Carli Whitehead*
Attorneys

Patented Aug. 21, 1945

2,383,405

UNITED STATES PATENT OFFICE 2,383,405

BALANCING METHOD AND APPARATUS

Marcellus S. Merrill and Claude M. Hathaway,
Denver, Colo.

Application July 27, 1940, Serial No. 350,366

12 Claims. (Cl. 73—66)

This invention relates to the balancing of rotatable bodies, and to the testing thereof as to static and dynamic balance, and more particularly to novel means for determining the point or points on such a body at which corrective measures should be applied to neutralize a state of unbalance.

Objects of the present invention are to provide, in apparatus and operations of the class described:

1. Apparatus by which the point or points, on an unbalanced body, at which corrective measures should be applied, may be readily and positively determined.
2. Apparatus by which such point or points on such a body may be determined by visual observation.
3. Apparatus whereby, when a body is tested while in rotation, the disturbing force generates electrical impulses which may be translated and amplified, and made to control the firing of a stroboscopic lamp to furnish a visual indication for observation as aforesaid.
4. Means to positively insure the firing of such lamp at the desired point in the rotative cycle of such body, regardless of the magnitude of the force due to unbalance effective at the particular instant.
5. Means for translating a voltage, generated as aforesaid, into electrical impulses successively, of such unconventional wave forms, that an impulse acts practically instantaneously to fire said lamp at a positively predetermined point in the rotative cycle of the body being tested.
6. Apparatus wherein the requirements for adjustment of the electrical elements for the determination desired are at a minimum.
7. Means and methods whereby observations of a rotating body being tested, such, for instance, as an automobile wheel, may be made while said wheel is mounted on the spindle with which it is associated in practical use, whereby the observations may be made under substantially natural operative conditions, and also whereby the labor of removing the wheel for testing, and thereafter replacing the same, is obviated.
8. Means and methods whereby a rotating body may be tested for balance at a critical speed of rotation, to insure accurate and positive results from the making of visual observation as aforesaid.
9. Means for substantially suppressing the effect of vibrations of a frequency higher than vibrations due to the disturbing force for which correction is to be made, to further insure accurate and positive results.

10. Apparatus wherein an electric current is generated and measured, to furnish an indication of the magnitude of the unbalance of a rotating body being tested.

11. Apparatus which is simple in operation, needful of little adjustment, and promptly responsive and positive in operation; and generally to improve upon apparatus and methods heretofore in use for the testing of rotatable bodies for static and dynamic unbalance for the correction thereof.

Our invention consists in the construction, arrangement, and combination of elements, and in the nature, character and sequence of operative steps, as hereinafter set forth, defined in the claims, and illustrative by the accompanying drawings, in which—

When a reference numeral is underscored in the drawing, such numeral designates a unitary part of apparatus comprising elements separately designated by other reference numerals.

The detailed description of the apparatus and methods hereinafter set forth will be more readily followed if it be initially stated that our invention contemplates the visual observation of a rapidly rotating body, statically or dynamically unbalanced, and rendered apparently stationary by regular, intermittent flashes of a stroboscopic lamp, flashing in predetermined interrelation with the position of the disturbing weight in the rotative cycle. An identified point on the rotating, but apparently stationary, body is observed stroboscopically, the body is brought to rest, the identified point is placed in the same position in the circle of rotation as it appeared when observed, and it is thereby known that correction for the unbalance should be made on a predetermined diameter of the rotating body. Such diameter will be substantially vertical as to static unbalance, and substantially horizontal as to dynamic unbalance, if the rotating body and the electric pick-up and translation apparatus be associated as illustrated and as hereinabove and hereinafter particularly described.

The instant invention is adaptable to a wide variety of uses, and to the testing of rotatable bodies of diverse shapes and structure. However, as the invention has heretofore found specific practical application in the testing of automobile wheels, it will be described in detail in this connection.

Figures 3, 4:
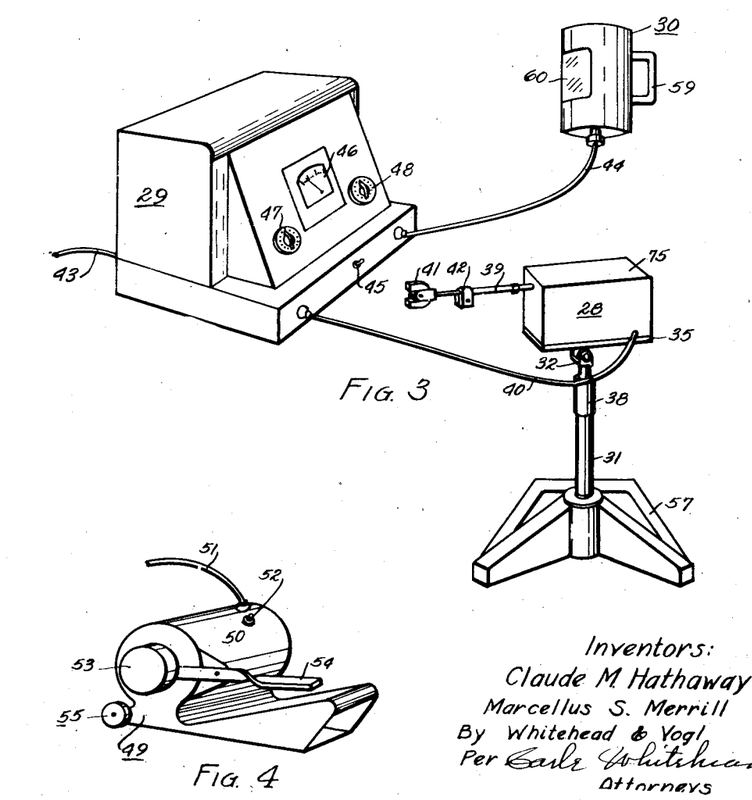
Fig. 3 is a perspective view of certain units of apparatus used in carrying out our invention, assembled in operative relation.
Fig. 4 is a perspective view of a rotator which may be used to set a wheel in rotation for testing purposes.

Referring to Fig. 4: Wheel 21 is adapted for rotation about an axis 22, but is so constructed that there is an unequal distribution of weight about the axis of rotation, that is to say, a small segment of the wheel is overweighted in relation to the remainder. In practice this overweight may result from any one of several causes, such as the valve assembly, an extra thickness of tread at some particular point, or other similar factor. In the illustration the overweighted segment is indicated by the shading 23. It is obvious that when the wheel is rapidly rotated the weight 23 will produce a centrifugal force exerting a continuous pull at right angles to the axis of rotation along a radius joining the weight and the axis, shifting in direction continuously in accordance with the position of the weight in its circle of rotation. Thus when the weight is at the position indicated at a, of Fig. 1, the force exerted will be in the direction of the down-pointed arrow, and when the wheel has revolved 180 degrees to the position indicated at b, of Fig. 1, the force will be exerted in the opposite direction, indicated by the up-pointed arrow.

If a wheel such as just described be placed upon a spindle about which it is free to rotate, with the diameter on which the disturbing weight is located positioned otherwise than vertical, the wheel will rotate until the disturbing weight is at the bottom of the circle of rotation. This is a method of testing which has heretofore been practiced, and when the condition, just described, obtains, the wheel is said to be in a state of "static unbalance."

However, even though a wheel may be in perfect static balance, it may be in a state of "dynamic unbalance," which will be made clearer by reference to Fig. 2, and a consideration of the wheel 24, rotatable about an axis 25, as therein indicated. In this example a strip of the tread adjacent one edge thereof, and extending half way around the wheel, is indicated as being overweighted, as shown by the shading 26; a similar overweighted strip adjacent the opposite edge of the tread and extending around the tread in the opposite semi-circumference, is indicated by the shading 27. It is obvious that if the overweighted strips be in all respects equal and oppositely disposed, both laterally of the tread and circumferentially, they will mutually compensate, and there will be no static unbalance, as heretofore described.

However, it is well known that when there is no plane of symmetry perpendicular to the axis, reactions are exerted on a revolving wheel at right angles to the plane of rotation. Thus, overweighted strip 26 occasions a centrifugal force radially of the axis of rotation; but, as strip 26 is not symmetrically disposed with reference to the plane of rotation, a reaction is exerted which is the equivalent of a force acting in the direction of the arrow. Likewise, there is a similar reaction in the opposite direction occasioned by strip 27. Thus when wheel 24 is in the phase of rotation indicated at a of Fig. 2, the overweighted strips exert forces in the directions of the arrows, but when the wheel has turned one-half a revolution, to the position shown at b of Fig. 2, the axial directions of the forces due to the overweighted strips will be reversed, as also indicated by arrows.

Even if the effects of unbalance are due to small amounts of uncompensated weight, when the rate of rotation is rapid, as in the case of modern automobiles, the forces produced may be great. Thus the vertical impulses, due to static unbalance, may become too great to be absorbed by the springs, and may be transmitted as impacts to the car body. Likewise, the horizontal forces due to dynamic unbalance may cause the wheel to wobble, and may become so great that steering is rendered extremely difficult. If it should happen that the periodicity of the reactions occasioned by these forces coincides with a natural rate of vibration inherent in the system and structure with which the wheel is associated, the effects are greatly magnified. The situation so existing is dangerous, and calls for corrective measures, which usually consist in adding compensating or balancing weights to the wheel, which is the method herein described. Obviously it may be convenient, in the case of rotating bodies of certain classes, to make correction by diminution of weight diametrically opposite the points of addition referred to in the specific instances herein described; also, that corrections do not necessarily have to be made on a single diameter, as herein mentioned, but that a combination of corrections may be applied to give a proper resultant.

It will of course be understood that the conditions as to weight concentration indicated in the drawing, and the effective locus of unbalance occasioned thereby, have been assumed merely for clarity of illustration and explanation; in practice a number of weights, unsymmetrically disposed radially or circumferentially, may result in an effective locus of unbalance substantially equivalent to the conditions hereinbefore assumed, and calling for substantially similar corrective measures.

Figure 13:
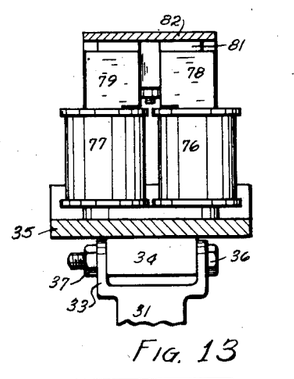
Fig. 13 is a view of said pick-up taken along the line 13—13 of Fig. 10.

We will now proceed to a general description of the apparatus whereby we determine the point or points at which corrective weights should be affixed to the wheel, and the amount of such weights. The various elements of such apparatus are comprised in three units shown in Fig. 3, said units consisting of an electric pick-up unit 28, a translator assembly unit 29, and stroboscopic lamp 30. The pick-up unit is pivotally mounted upon a standard 31 by any convenient means, such as hinge 32, which is more clearly shown in Fig. 13, wherein upper portion of standard 31 is shown as a yoke 33 within which a tongue 34, underlying and rigidly attached to a mounting plate 35, is received. Each fork of yoke 33 is suitably apertured, and tongue 34 is suitably bored so that said tongue may be inserted within said yoke, with said apertures and bore in registering alignment for the reception of a bolt 36, provided with a tension nut 37, whereby mounting plate 35 may be held in a desired plane.

Pick-up unit 28 is preferably adjustable altitudinally and this may be conveniently accomplished by forming standard 31 in two telescoping parts, said parts being held in suitable longitudinal relationship by a sleeve 38 surrounding a portion of each of the telescoping parts and suitably threaded internally so that rotation of sleeve 38 clamps the telescoping parts of standard 31 in adjusted interrelation.

Pick-up 28 is provided with a plunger 39, suitably associated with the inner organization of the pick-up, as hereinafter more particularly described, so that a longitudinal movement of the plunger in either direction actuates elements to induce a voltage and generate a feeble electric current, which is transmitted by wires within the cord 40 from the pick-up to assembly unit 29, within which it is associated with certain circuits, as will more fully hereinafter appear in connection with a description of the wiring diagram, Fig. 15.

Plunger 39 is provided, at its extremity remote from the body of the pick-up unit, with means for attachment to a suitable element of the assembly with which a wheel under test is associated, such means being here indicated as a magnet 41 of conventional type. The length of plunger 39 is preferably adjustable, and this may be conveniently accomplished by forming said plunger in two telescoping parts, adjustably held in suitable longitudinal relation by clamp 42.

Assembly unit 29 is supplied with power from a convenient source, such as an electric distribution system, by wires contained within the cord 43, and is provided with suitable circuits and instrumentalities for receiving voltage impulses initiated by pick-up 28, through wires within cord 40, and for translating said impulses in a suitable manner to furnish a voltage out-put through cord 44 to lamp 30, for firing said lamp when a weight 62 (Fig. 6) is at a definite point in the rotative cycle. Such firing of said lamp is accomplished by special circuit arrangements hereinafter described; and said lamp fires only once during a full reciprocatory cycle of plunger 39, that is, when a positive impulse is impressed upon grid 131 of lamp 30.

Assembly unit 29 is provided with a switch 45 to control power input through cord 43, with a meter 46 to measure current generated by pick-up 28 and transmitted through cord 40, a rheostat 47 to control the sensitivity of meter 46, and a rheostat 48 to control the sensitivity of response of lamp 30. The dial of meter 46 is preferably graduated to indicate microamperes.

For the purpose of setting an automobile wheel in rotation when the front end is jacked up so that the wheel is out of contact with the floor, in making a test as hereinafter described, we provide a rotator shown in Fig. 4 and designated as an entirety by the reference numeral 49, and although any suitable apparatus may serve the purpose, rotator 49 will be very briefly described as illustrative of a convenient means of accomplishment.

Rotator 49 comprises a motor 50, adapted to rotate at convenient speed, receiving electric energy from a convenient source through the cord 51, which energy is controlled by a switch 52. Rigidly mounted upon the shaft of said motor is a cup-shaped rotor 53, operatively associated with a brake lever 54, the depression of which, by actuating suitable means interiorly of rotor 53, decelerates the rotation of the same and any operatively associated elements. Roller 55 has no operative connection with the mechanism, but is merely one of a pair of oppositely disposed casters, the other not being shown on account of the position of view.

Figure 1:
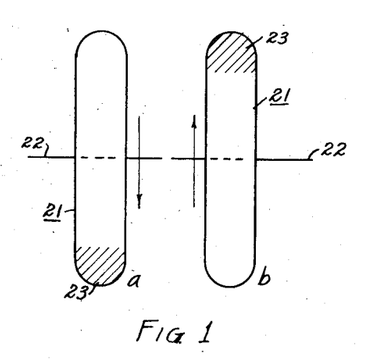
Fig. 1 is a diagrammatic representation, in front elevation, of a statically unbalanced wheel, at two different positions in a cycle of rotation, the shading indicating concentrated weight.
Figure 5:
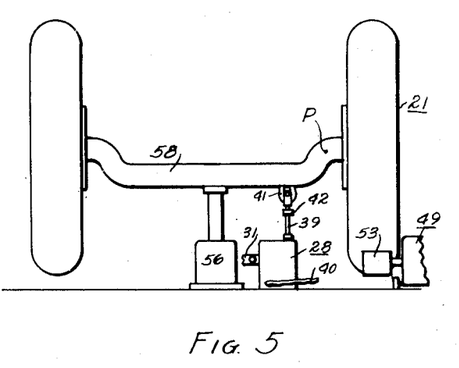
Fig. 5 is a diagrammatic representation, in front elevation, of the front wheel and axle assembly of an automobile, associated with an electric pick-up for testing as to static balance, the axle and spindles being purposely indicated as integral, for clarity of explanation.

We will now describe a method of testing a statically unbalanced wheel, such as 21 of Fig. 1, by reference to Fig. 5; and in this connection we call attention to the fact that all tests, both for static and for dynamic balance, are made while the wheel is mounted on the spindle with which it is associated in ordinary use, so that the test is made under substantially natural operative conditions, and in addition the labor and time consumed in removing the wheel for testing, and thereafter replacing the same, are saved.

The front wheel and axle assembly of an automobile is raised slightly above the floor by a jack 56 disposed, and bearing upwardly on the axle, intermediate the wheels, only one jack being used. The pick-up unit 28 is removed from its base, with which it is removably and replaceably associated for the purpose, and which is designated in Fig. 3 by the reference numeral 57. Pick-up 28 is then placed in such position that plunger 39 extends upward. Standard 31 may be swung downward, about the pivot of hinge 32, so that the end remote from the body of the pick-up rests on the floor, or said standard may be otherwise conveniently supported, so that pick-up unit 28 will be stable when plunger 39 is vertically disposed. The length of plunger 39 is adjusted, and held in adjustment by clamp 42, so that the extremities of the magnet 41 just touch the under surface of axle 58 as shown in Fig. 5, so that said plunger is adapted for vertical reciprocation in response to vertical oscillations of axle 58.

In Fig. 5 standard 31 is shown as being broken away, as is also cord 40, for clarity of illustration. Cord 40 is, however, connected with assembly unit 29 as shown in Fig. 3; assembly unit 29 is connected to lamp 30 as also shown in Fig. 3, and switch 45 is actuated so that power from a convenient source is supplied to said assembly unit. Unit 29 is conveniently positioned so that the operator may easily observe the dial of meter 46 while holding lamp 30 by handle 59 in such position that flashes of light through window 60 of lamp 30 illuminate the side of wheel 21 shown in Fig. 6.

A chalk mark 61 is made on the side of the wheel, preferably near the periphery thereof, to serve as a point of reference during the test, or any other marking or feature, such as an existing valve stem, may be used for reference and observation.

Figure 6:
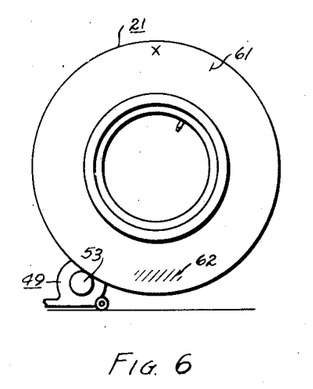
Fig. 6 is a showing in side elevation of a statically unbalanced automobile wheel, having certain markings used in testing by our method, the shading indicating concentrated weight.

The wheel 21 is thereupon set in rotation by a device suitable for such purpose, such as rotator 49, positioned as indicated in Fig. 6. As wheel 21 rotates, vertical vibrations of axle 58 occur, whereby plunger 39 of pick-up 28 reciprocates vertically, occasioning currents which are transmitted to assembly unit 29 through cord 40; the amount of one of which currents, through a circuit internally of assembly 29, being indicated by meter 46, and the other of said currents imparting voltage through another circuit to cause lamp 30 to fire at intervals. These currents are preferably generated through two separate sets of windings in pick-up 28. The reading on the dial of meter 46 will ordinarily be small, and with the particular arrangement which we use will be, say, 20 microamperes. However, as the speed of rotation of wheel 21 increases, a critical speed will be reached, at which the vibration will become noticeably greater, and the reading on the dial 46 will increase to, say, 200 microamperes. The acceleration of the speed of rotation of wheel 21 is continued beyond this critical point, the rotator is removed, and deceleration is permitted to take place gradually. During the course of this deceleration the critical speed is again reached, and upon observing mark 61, under light produced by lamp 30, said mark will appear to be stationary. This apparently stationary position of the mark is due to the fact that lamp 30 always fires when the disturbing weight 62 is at a definite point in the circle of rotation, the mark 61 hence always being in the same position at the instant of each firing, the system, of which the wheel is a part, being in resonance. The apparently stationary position of mark 61 is noted, and the wheel brought to rest. If, for instance, the mark appeared stationary at a point in the circle of rotation corresponding to the numeral 2 on a clock dial, the wheel is set on its spindle so that mark 61 occupies the same position as when observed while the wheel was in rotation. It is then known, if the circuit arrangement which we prefer is employed, that the vibration was caused by a weight 62 at the bottom of the wheel. A mark $x$ is then made at the upper extremity of a vertical diameter of the wheel, and it is adjacent and radially of this mark that a weight may be applied to neutralize the effect of weight 62.

The maximum reading of meter 46 during deceleration, affords a rough indication of the amount of weight to be added, as this reading is proportional to current received from the pick-up, which, other things being equal, is determined by the amount of unbalance. The location at which the weight is to be applied having been determined, it is a simple matter to arrive at the proper amount of corrective weight by successive tests in the manner hereinabove pointed out, until the amount of unbalance, as indicated by the reading of meter 46, is negligible, and in practice it has been found that an operator, after short experience, can readily arrive at accurate results.

For clarity of illustration and explanation, the foregoing test has been described with reference to an automobile having a front axle. The same principle is, however, applicable to all automobile constructions, the body being suitably supported and the pick-up positioned to respond to vertical oscillations. Thus, in the case of automobiles the wheels of which are independently sprung, the pick-up unit may be positioned under a front bumper bracket.

We will now describe the test for dynamic unbalance. This test should be preceded by test for and correction of static unbalance.

Figure 7:
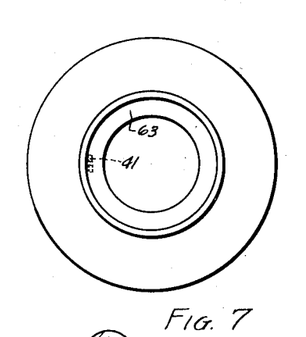
Fig. 7 is a showing of an automobile wheel, in side elevation, about to be tested for dynamic unbalance, contact with the plunger of an electric pick-up being indicated in dotted lines.
Figure 8:
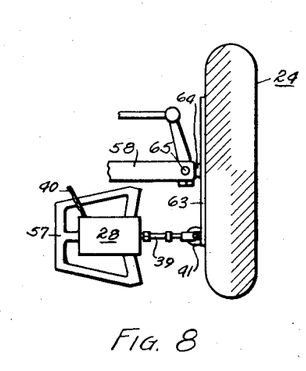
Fig. 8 is a plan view of a dynamically unbalanced wheel mounted on the front axle of an automobile in association with an electric pick-up for testing, a part only of the axle and steering means being shown, the shading representing concentrated weight.

In making the test for dynamic unbalance, standard 31 is replaced in base 57 and so adjusted that magnet 41 may be brought into contact with brake support plate 63 at the proper position. Such position is indicated in Figs. 7 and 8, showing the pick-up unit 28 intermediate the wheels of the automobile and adjacent the wheel being tested, the magnet 41 being in contact with support plate 63 on a forward horizontal radius thereof. In Fig. 8 wheel 24 is shown as part of an assembly such that spindle 64, upon which the wheel rotates, is pivotally connected with axle 58 by means of king pin 65.

With the apparatus arranged as indicated in Figs. 7 and 8, and otherwise as described in reference to testing for static unbalance, the wheel is set in rotation and allowed to decelerate, and at a critical speed resonance will be observed as before. The apparently stationary position of a mark, such as 61 in Fig. 6, is observed, reading of meter 46 is taken, the wheel is brought to rest, and the mark placed in the same position as when the observation was taken.

Figure 2:
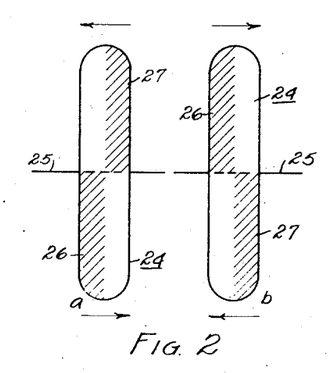
Fig. 2 is a diagrammatic representation, in plan view, of a statically balanced, but dynamically unbalanced, wheel, at two different positions in a cycle of rotation, the shading indicating concentrated weight.
Figure 9:
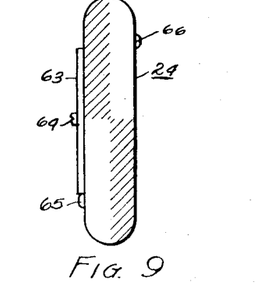
Fig. 9 is a plan view of the same wheel shown in Fig. 8, with the indication of weights added, after testing, to neutralize dynamic unbalance.
Figure 10:
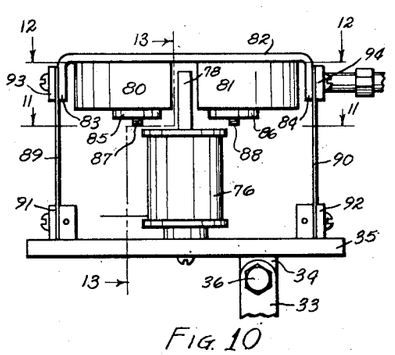
Fig. 10 is a side elevation of an electric pick-up unit which may be used in carrying out our invention, the housing of said pick-up being removed.
Figure 11:
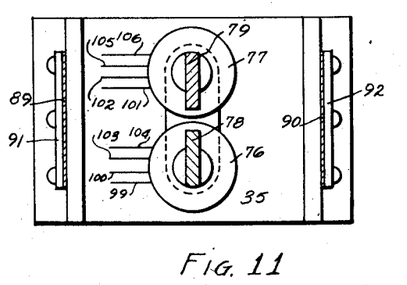
Fig. 11 is a plan view of said pick-up unit, taken along the line 11—11 of Fig. 10.

It is then known, if the circuit arrangement which we prefer is employed, that the effective locus of dynamic unbalance is on a horizontal diameter, and that when lamp 30 actually fired the force occasioned by the unbalance was acting in the direction indicated by the arrow at $b$ of Fig. 2. If the concentrations of weight are as indicated in the drawings, correction may be applied by adding two weights 65 and 66 as shown in Fig. 9. However, the locus of dynamic unbalance may be such that one weight should be added on a forward radius, and two on a rear radius on opposite sides of the plane of rotation. The condition existing will appear by tentatively adding weights as shown in the drawings, and noting the effect. If it should happen that weights theretofore placed on the rim to correct for static unbalance are at the points indicated for placement of weight to correct for dynamic unbalance, all or part of the former weights may be moved from the inside of the rim to the outside, or vice versa.

The amount of dynamic unbalance may be estimated by the meter reading as in the case of static balancing, and further tests conducted, and additions to or diminutions of corrective weights made, and weights shifted in position, until the meter reading indicates a negligible amount of dynamic unbalance.

At the commencement of all tests, either for static or dynamic unbalance, the sensitivity of meter 46 and of lamp 30 should be adjusted at the minimum, by means of rheostats 47 and 48, respectively, and as the test progresses the sensitivities may be increased.

The tests described have been with reference to the front wheels of an automobile, but the same principles apply to tests of the rear wheels. In the latter case, the wheel under test may be rotated by the motor of the car, the other wheel being restrained from rotation by any convenient means; and pick-up 28 may be attached to any available part of the car to respond to vertical or horizontal vibrations.

If in any test the correct balance is not found readily the situation may be due to bent wheels, distorted tires or defective bearings, which should be corrected before proceeding further; thus, the principles of our invention are available also for the discovery of defective mechanism by the oscillations of plunger 39 made to occur thereby.

The foregoing tests as to static balance have been described upon the assumption that during the period of resonance lamp 30 will fire when weight 62 is at a definite, known point in its cycle of rotation. The exact point is wholly immaterial, as the same may, as to any particular set-up of apparatus, be ascertained by placing on axle 58 a wheel known to be in balance, deliberately unbalancing it by a visible weight, and observing such weight directly under flashes from lamp 30. If minute accuracy should be required, it could be obtained by rotating the wheel under test first in one direction and then reversely, observing a given mark as to exact position during each run, and bisecting the angle between the observed, apparently stationary, positions. In considering the rotational position of a weight such as 62 in reference to the firing of lamp 30, two lags, one mechanical and one electrical, hereinafter particularly mentioned, may be kept in mind, as well as the circuits through which the impulses generated by pick-up 28 are made to affect said lamp.

During the deceleration of wheel 21, in a static unbalance test as above described, the rotational speed of said wheel passes through a stage at which the vertical oscillations correspond to the rate of resonance of the system of which the wheel is a part. Experience has shown that observations taken with my apparatus while such resonance obtains accurately indicate the position of the disturbing weight, and it is highly preferable that observations be taken during such period of resonance.

It is a matter of common knowledge that, in general, single bodies, or organizations of elements, adapted to vibrate, have a natural frequency, or rate of vibration. A common illustration is the tuning fork, the prongs of which may make, say, several hundred vibrations per second.

For convenience of reference, let the letter P represent some particle in axle 58 adjacent wheel 21. This particle is a part of a vibrational system, kept in a state of vibration, when the wheel is rotated, by the forces indicated by the arrows in Fig. 1. It is obvious that the system of which P is a part is complicated, and is subject to substantial damping. Nevertheless, said system does have a definite, natural, rate of vibration, although it is not necessary to determine such rate in carrying out the principles of our invention. For the purposes hereof it may be assumed that P vibrates in a vertical arc.

It is well known that if two tuning forks be accurately adjusted to the same pitch, one will be set in vibration by the sound waves from the other. It is also well known that a tuning fork may be set in vibration if its prongs be arranged in reference to an electromagnet for the periodic application of a magnetic force. If this force be applied at intervals corresponding to the natural frequency of vibration of the fork, vibrations of large amplitude will occur; on the other hand, if the magnetic force be strong enough, the prongs may be made to vibrate differently from their natural rate, in which case the vibrations are said to be "forced." The foregoing will render plain the behavior of axle 58, and the firing of the lamp 30 in response thereto, as hereinbefore described, and the importance of making observations and taking meter readings at resonance.

In an elastic, damped vibrational system, similar to that here under discussion, at resonance the impelling force, operating on the system to maintain the vibration, leads the vibrational displacement by substantially 90 degrees, or, conversely, the displacement lags the force by substantially 90 degrees. Thus when wheel 21 rotates clockwise, and weight 62 is at the position 12 of a clock dial, said weight exerts its maximum upward pull on axle 58. But on account of the lag mentioned, said weight has moved to the position of clock dial 3 by the time particle P reaches the uppermost position in its path of oscillation.

Figures 15, 16:
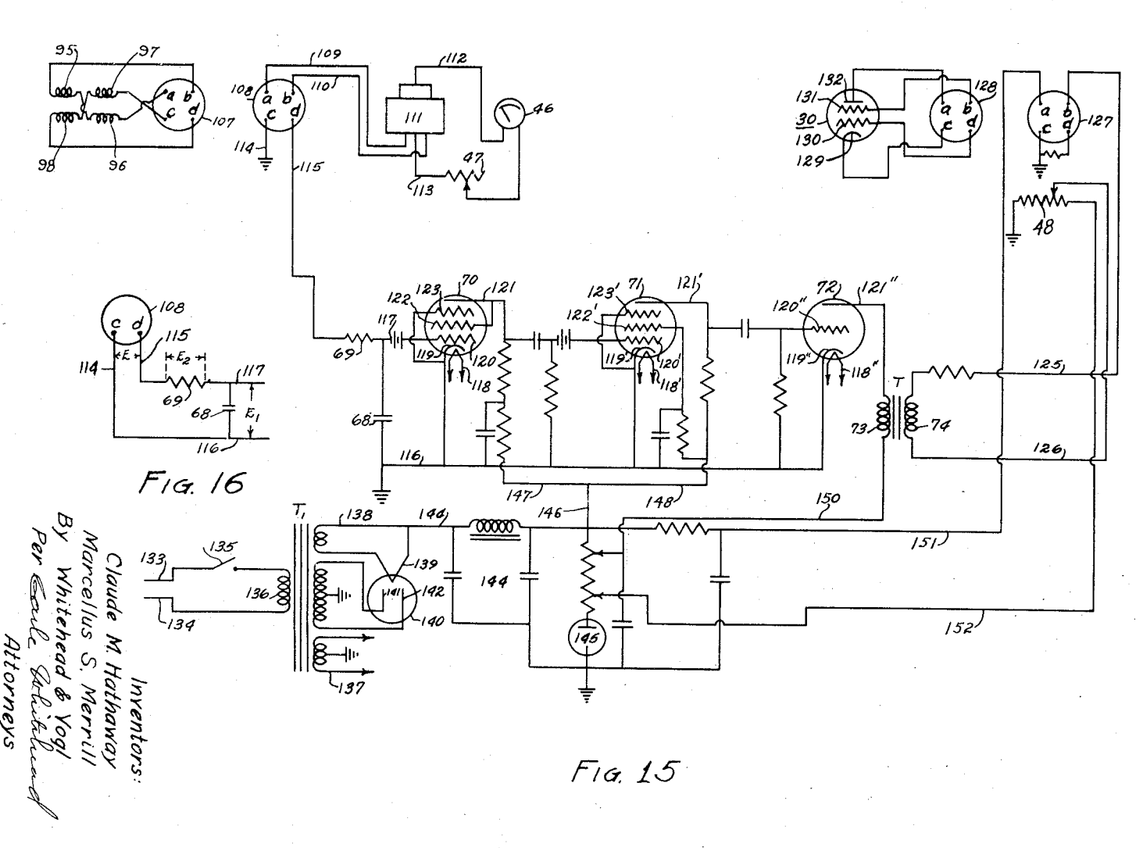
Fig. 15 is a diagrammatic representation of an electric circuit, and its connections with apparatus, suitable for carrying out the principles of our invention.
Fig. 16 is a diagram of part of the circuit of Fig. 15, separately shown for facility of reference to certain features.

In the circuit shown in Figs. 15 and 16 it has been found convenient to employ a net-work including a condenser 68 and a non-inductive resistance 69.

In the circuit preferably employed in the utilization of our invention the voltage across the terminals of condenser 68 lags the current by 90 degrees; and, as such voltage is impressed upon the translation system, through conductors 116 and 117, connected in parallel with said network, across the terminals of the condenser, a phase difference of 90 degrees is introduced.

While it would be possible to adjust lamp 30 to fire when a definite voltage is impressed upon its grid, this would require delicate adjustment; if the voltage initiated by pick-up 28 should increase, the lamp would fire too soon; on the other hand, if such voltage should decrease, the lamp would not fire at all.

To insure the positive firing of the lamp at a definite point in the rotative cycle of weight 62, it has been necessary to incorporate in the electric circuit, intermediate the pick-up and the lamp, certain special features. These can best be described in a general way at this point, although the details will more clearly appear in connection with the consideration of the electric circuit diagrammatically illustrated in Fig. 15.

Figure 14:
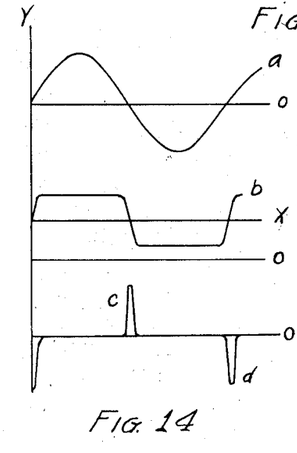
Fig. 14 illustrates certain curves useful in explaining features of the electric circuit utilized in connection with our invention.

It will now be convenient to refer to Fig. 14. Curve a therein is a sine curve, conventionally employed to graphically represent any regular, periodic movement or force. Measurements along line Y indicate amplitude or quantity, and measurements along line O indicate time. Thus any point on the curve represents a given amplitude or quantity at a definite instant in a cycle. Said curve will, for the moment, be assumed to represent an alternating current or voltage.

In the embodiment of our invention as illustrated and described, the translation system intermediate pick-up 28 and lamp 30 may conveniently include three stages, in each of which a vacuum tube of well known type is utilized, said tubes being indicated in Fig. 15 by the reference numerals 70, 71 and 72, the out-put of the last of which passes through the primary 73 of transformer T and induces a voltage in its secondary 74. The voltage indicated by E, in Fig. 16 is associated with tube 70, the output of which is associated with high gain amplifier tube 71. The gain is sufficiently great that a small fraction of the output of tube 71 saturates the last stage, in which tube 72 is utilized. In other words, after a certain output from tube 71 has been impressed upon the circuit associated with tube 72, no increase in the output of tube 71 will affect the output of tube 72. Therefore, the output of tube 72 is not represented by a conventional curve such as $a$ of Fig. 14, but is more properly represented by a curve such as $b$ of said figure, which is substantially flat over most of each half cycle. When a substantially constant current, represented by the flat portions of curve $b$, flows through the primary 73 of transformer T, there will be no appreciable voltage induced in the secondary 74. However, as the current changes in value, as indicated by the substantially vertical portions of $b$ which intersect line X, the voltage induced in the secondary 74 will be considerable. The rapidity of the change is indicated by the steep slope of said sections of curve $b$. Such rapid changes in current induce in secondary 74 short, sharp impulses, represented by peaks $c$ and $d$ in Fig. 14, one of which, the positive, fires lamp 30. Thus the time of firing of the lamp is not related to any quantitative characteristic in the circuit.

The principles hereinbefore discussed, and illustrated by reference to a static balance test, also apply to the operation of the apparatus when a test is made for dynamic balance.

I have hereinbefore made general reference to pick-up 28. There are available a number of pick-ups which could be used, but as that herein mentioned seems particularly suitable for the purpose, and is used in the commercial practice of our invention, we will here describe it briefly.

Pick-up unit 28 is provided with a housing 75 as indicated in Fig. 3, enclosing certain elements which are shown, in Figs. 10 to 13 inclusive, with the housing removed, said elements being illustrated in said last mentioned figures as being rigidly mounted upon base plate 35, by any convenient means. Centrally disposed on said base plate are two coils 76 and 77, provided respectively with magnetically permeable cores 78 and 79 extending through the windings of said coils to form tips thereabove; the upper extremities of said cores are of rectangular cross-section, and said extremities are aligned so that the horizontally wider vertical surfaces of each are co-planar with similar surfaces of the other.

Figure 12:
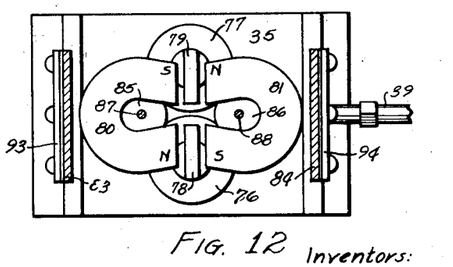
Fig. 12 is a plan view of said pick-up unit taken along the line 12—12 of Fig. 10.

The tip of each of said cores is disposed between the pole tips of two magnets 80 and 81, as clearly indicated in Fig. 12. Said magnets are firmly affixed to the under surface of a cramp-shaped magnet support plate 82 provided with downwardly extending flanges 83 and 84; such affixation of such magnets may be conveniently accomplished by washers 85 and 86, threadedly receiving bolts 87 and 88 suitably attached at their upper ends to plate 82. Plate 82 is supported a suitable distance above plate 35, as by vertical flexure leaves 89 and 90, so that the pole tips of magnets 80 and 81 are in suitable spaced relation with core tips 78 and 79, the lower portions of said leaves being rigidly attached to base plate 35 in any suitable manner as indicated at 91 and 92, the upper extremities being firmly affixed to the downwardly extending flanges of plate 82 as indicated at 93 and 94.

Each of the coils 76 and 77 is provided with two windings, diagrammatically represented in Fig. 15 and designated by the numerals 95, 96, 97 and 98. Pairs of conductors 99—100, 101—102, 103—104, 105—106 are respectively connected with the extremities of said windings.

The extremity of plunger 39 adjacent the body of the pick-up is rigidly affixed to the flange 84 of support plate 82 in any convenient manner, so that longitudinal reciprocations of plunger 39 will cause corresponding movements of support plate 82, whereby the pole tips of magnet 81 approach tips of cores 78 and 79 when plunger 39 moves toward the body of the pick-up unit, and pole tips of magnet 80 approach the tips of said cores when said plunger moves in the opposite direction. Said magnets are so arranged that the magnetic pole of one is adjacent the opposite magnetic pole of the other, the arrangement being such that the poles indicated by the N and S as shown in Fig. 12 indicate the polarity arrangement; or, the magnets may be so arranged that the poles are disposed in a reverse manner.

It is obvious that reciprocation of plunger 39 will effect alternate increases and decreases in the gaps between the pole tips of magnets 80 and 81, respectively, and the core tips, thereby occasioning a magnetic flux which will induce voltages in each of the four windings hereinbefore mentioned.

Each winding of one coil is connected in series with a winding of the other coil so that the voltages induced in the windings so connected are additive in effect. The free ends of each seriespair of windings are connected with suitable conductors, within cord 40 intermediate the pick-up unit and assembly unit 29, and each of said conductors is in electrical connection with one of the contact elements of a four-terminal plug at the extremity of said cord adjacent assembly unit 29, and diagrammatically represented in Fig. 15 and designated by the reference numeral 107, so that a voltage induced in one set of windings will exist between terminals $a$ and $b$ of said plug and a voltage induced in the other set of windings will exist between terminals $c$ and $d$ of said plug.

A socket in assembly unit 29, and diagrammatically represented in Fig. 15 and designated by the reference numeral 108, is adapted for connection with plug 107; said socket is provided with four jacks $a$, $b$, $c$ and $d$, which respectively receive in electrical contact the terminals $a$, $b$, $c$ and $d$ of plug 107. In view of such connections, in discussing Fig. 15 voltage impulses will be treated as initiated between jacks $a$ and $b$, and $c$ and $d$, of socket 108.

The current between jacks $a$ and $b$ of socket 108 passes through conductors 109 and 110 to a suitable rectifier 111, which may be of the well known copper oxide type, the output circuit of which is indicated by conductors 112 and 113, which serve to pass the current through the rheostat 47, also indicated on assembly unit 29 as shown in Fig. 3, for controlling the sensitivity of meter 46, of a well known type adapted to measure the current flowing in conductors 112 and 113.

The alternating voltages existing between jacks $c$ and $d$ of socket 108 cause a flow of alternating current in a circuit which includes conductors 114 and 115. For simplicity of description of certain circuit features, a portion of the circuit under consideration is separately shown in Fig. 16, conductor 114 being indicated in continuity rather than by ground symbols, the other elements in Fig. 16 being identical with, and numbered the same as, elements in Fig. 15.

The flow of current between $c$ and $d$ is through the following circuit: $c$—114—68—69—115—$d$. A voltage output from said circuit is supplied to tube 70 through conductors 116 and 117 for translation by a system which includes tubes 70, 71 and 72. Said tubes are respectively provided with heater coils 118, 118' and 118"; cathodes 119, 119' and 119", heated by said heater coils; grids 120, 120' and 120"; and plates 121, 121' and 121". Tubes 70 and 71 are of the conventional pentode type and tube 72 is of the conventional triode type. Tubes 70 and 71 are provided with screens 122 and 122' and supressors 123 and 123'; screen 122 is tied to plate 121 in tube 70, but screen 122' is conventionally connected in tube 71.

The circuits in the system including tubes 70, 71 and 72 are obvious, and the elements thereof are indicated by conventional symbols, so it is not thought necessary to trace the path of all impulses and reactions. Wherefore, suffice it is to say that voltage impulses received through conductors 116 and 117 are translated in such manner and modified by the high gain amplifier tube 71 and the triode 72 that the current flow in the plate circuit of said tube 72 produces voltage variations across the load impedance 73 comprising the primary of transformer T, in wave form similar to that indicated by curve $b$ of 14, producing sharp voltage impulses in secondary 74 in wave form similar to that indicated by curve $c$ of Fig. 14.

A cord 44 connects assembly unit 29 with lamp 30; said cord is provided with a four-terminal plug 127, indicated in Fig. 15, at the extremity thereof at said lamp, and said lamp is provided with a socket 128, also indicated in Fig. 15; jacks $a$, $b$, $c$ and $d$ of said socket receive terminals $a$, $b$, $c$ and $d$ of said plug. Lamp 30 is provided with a cathode 129, grids 130 and 131, and plate 132, in such arrangement and association between themselves and the circuits involved, that the impression of a positive charge on grid 131, from the secondary 74 of transformer T, through jack $b$, causes lamp 30 to fire.

The necessary currents and voltages to maintain the translation system and lamp 30 in condition such that said lamp is responsive to impulses to cause firing as aforesaid, may be supplied in any convenient manner. In practice we utilize the alternating current from an electric distribution system. Power is supplied through leads 133 and 134, switch 135, and primary 136 of transformer $T_1$.

Secondary 137 of transformer $T_1$ furnishes current to heat elements 118, 118' and 118" of the vacuum tubes, the terminals of which elements, denoted by arrows, are connected with the terminals of secondary 137, also denoted by arrows.

Secondary 138 of transformer $T_1$ heats a filament 139 of a full wave rectifier 140 of conventional construction and provided with plates 141 and 142. Said filament 139 is in series with filter 144. A voltage regulator of the gas-filled type may be provided as indicated by numeral 145. The direct current from the rectifier after passing through the filter 144 is applied to the plate circuit of the tubes 70 and 71 by conductor 146 and branch conductors 147 and 148 leading to tubes 70 and 71, respectively. The plate circuit of the tube 72 is likewise supplied with direct current from the rectifier through conductor 150 which connects with a resistor in series with the voltage regulator 145. The conductors 151 and 152 lead to the stroboscope.

From the foregoing description, and a reference to Figs. 15 and 16, the working of the circuits, and the effect of voltages generated by oscillations of plunger 39 upon lamp 30, will be obvious to any one skilled in the electrical art.

However, there are certain features of that part of the circuit illustrated in Fig. 16 to which attention should be called.

If an ordinary automobile wheel be tested at speed of rotation of 10 per second, this represents a linear travel of the car at a speed of about 50 miles an hour. It is therefore obvious that tests are made while the rotative speed is of this order and the oscillations of P will be at the same rate, as will also be the impulses generated by pick-up 28 and introduced into the translation system. It is also obvious that there should be adequate responsiveness to low frequencies of the order mentioned.

However, there may be vibrations, other than those under consideration, to which the apparatus might be responsive, and which are of a higher frequency than those mentioned. Thus, vibrations of the brake drum, vibrations occasioned by the rubbing of bearings, and the like, may occur. It is desirable that these extraneous responses be suppressed so far as possible. This accomplished by the circuit illustrated in Fig. 16.

Referring to Fig. 16:

Let E represent the voltages impressed by pick-up 28 between jacks $c$ and $d$ of socket 108.

Let $E_1$ represent the voltages impressed across condenser 68, and conductors 116 and 117, in parallel therewith.

Let $E_2$ represent the voltages impressed across resistance 69.

Let R represent the ohmic resistance of 69, which may be taken to be 2 megohms.

Let C represent the capacitance of condenser 68, which may be taken to be 0.25 microfarad.

Let X represent the impedance introduced by condenser 68; and this is equal to $$\frac{1}{2\pi f C}$$

in which $f$ represents the frequency of current and voltage, which, as to alternations occasioned by disturbing weights in a rotating wheel, may, for illustration, be taken to be 10 cycles per second.

Let Z represent the total impedance of the circuit between $c$ and $d$; and $Z^1 = \sqrt{R^2 + X^2}$ Let I represent the alternating current between $c$ and $d$.

Condenser 68 introduces a phase difference between E and I; and it is well known that such difference can be ascertained from the relations following:

$$E = IZ; \quad E_1 = IX; \quad E_2 = IR$$

then $$\frac{E_1}{E_2} = \frac{IX}{IR} = \frac{X}{R} = \tan \theta$$

the angle $\theta$ being an angle representing said phase difference in degrees.

But by computation the numerical value of X is found to be 66225.16; then the numeral value of $$\frac{X}{R}$$

is .0331, being the tangent of an angle of less than 2 degrees; this is negligible, and E and I may be deemed in phase in the practical application of our invention.

It is obvious that if $f$ increases, the value of X decreases proportionally; and since $E_1 = IX$, $E_1$ also decreases proportionally in case the value of I remain constant. The magnitude of such decrease is made more apparent by computing the value of X for cases in which the frequency is several hundred. Since $E_1$ represents the voltage impressed on tube 70, it is seen that the translation system is much less sensitive to high frequency impulses than would be the case in the absence of the arrangement described.

The foregoing discussion has been with reference to voltage frequencies existing at different times; however, in practice the high frequencies mentioned coexist with the low frequency to which response is desired, and the effect of the network of Fig. 16 is the same in this case also. Thus the arrangement shown substantially suppresses the effects of high frequencies while tests are being made.

It has been noted above that E and I are substantially in phase; E and $E_1$ are not. This follows from the fact that E is not the arithmetical sum of $E_1$ and $E_2$, but the vectorial sum thereof, and it can be shown from the foregoing equations that $E_1$ lags I, and hence lags E, by substantially 90 degrees.

The foregoing discussion is merely an amplification of statements found in the text books, to-wit: that in a circuit containing resistance and capacitance in series, the impressed voltage and the resulting current are substantially in phase if the value of the capacity reactance is negligible as compared with the value of the resistance; and that when a current passes through a condenser, a voltage exists across the terminals of the condenser, lagging the current by substantially 90 degrees, if there be no substantial absorbtion of power.

It will be seen from the equations given that in the circuit shown there can never be any substantial phase difference between voltage E and current I, for if $f$ be infinitely great, then $$\frac{X}{R}=0$$

and the phase difference is changed by less than 2 degrees. This is important, in that voltage $E_1$ is always substantially 90 degrees behind current I, and any substantial change of the phase of I would change the phase relation of E and $E_1$, and hence change the point in the rotative cycle of wheel 21 at which lamp 30 would fire. This is made plain by supposing that R=66,225 ohms, instead of 2 megohms, and that $f=10$. Then $$\frac{X}{R}=1$$

which is the tangent of an angle of 45 degrees, representing the phase difference between E and I, and hence between E and $E_1$. Then suppose that $f=20$; then $$\frac{X}{R}=0.5$$

being the tangent of an angle of about 26 degrees. It cannot be assumed that during resonance in any given test $f$ will be exactly 10, or any other definite number, and the value of $f$ will vary in different tests. Thus if the value of R be low, as just supposed by way of example, any difference between frequencies in different tests would cause a large phase difference between E and $E_1$, and hence changes in the point in the rotative cycle of wheel 21 at which lamp 30 would fire, rendering observations untrustworthy. Thus the necessity of the high resistance 69, and the functions thereof, are apparent.

While we have illustrated in the drawings, and herein described, many details of construction, and have described many details in method of operation of our invention, we are not to be restricted to such details, as many equivalent structural and method details will be obvious, as alternatives, to those skilled in the art, all within the spirit of the illustration and specification and the scope of the appended claims.

We claim:

1. A method of correcting static or dynamic unbalance of vehicle wheels while supported in operative position upon the vehicle, which comprises the steps of supporting an axle of the vehicle to free a wheel for rotation, rotating said wheel while operatively journalled by the axle at a speed in excess of resonant speed and then freely decelerating the wheel, generating an alternating-current voltage from the vibrations of the freely decelerating wheel produced by the unbalanced conditions of said wheel, firing a stroboscopic device by electrical impulses derived from the alternating-current voltage, detecting the locus of unbalance in the rotating wheel by correlating the stroboscopic flashes at resonant speed with a reference point on the wheel, measuring the alternating-current generated during deceleration of the rotating wheel and noting the maximum current during said resonant speed of the wheel, whereby the magnitude of unbalance is thus indicated, and then reducing the out-of-balance conditions by alteration in the mass of the rotated wheel with respect to the reference point.

2. A method of detecting the angular locus of the unbalanced portion of a vehicle wheel rotatably supported on an axle of the vehicle and forming therewith an elastic, damped vibrational system wherein the displacement caused by the unbalance lags the locus of mass by 90 degrees at the resonant speed of the system, comprising noting a characteristic mark on the wheel, freeing the wheel for rotation, rotating the wheel at a speed in excess of the resonant speed, freely decelerating the wheel at least to said resonant speed, generating electrical signals in synchronism with said vibrations, operating a stroboscopic device at a predetermined cyclic point of the signals, observing the apparent fixed position of the mark at the resonant speed of the wheel, and stopping the wheel and returning said mark to its apparent fixed position, thereby to locate the locus of unbalance at the same position relative to the vehicle, no matter what the resonant speed.

3. A method of detecting the angular locus of static and dynamic unbalance of a vehicle wheel rotatably supported on an axle of the vehicle and forming therewith an elastic, damped vibrational system wherein the displacement caused by the unbalance lags the locus of mass by 90 degrees at the resonant speed of the system, comprising placing a characteristic mark on the wheel, freeing the wheel for rotation, rotating the wheel at a speed in excess of the resonant speed, freely decelerating the wheel at least to said resonant speed, generating electrical signals in synchronism with vertical vibrations of the wheel supporting structure, periodically illuminating the wheel at a predetermined cyclic point of the signals, observing the apparent fixed position of the mark at the resonant speed of the wheel, stopping the wheel and returning said mark to its apparent fixed position, thereby to locate the locus of static unbalance at the same position relative to the vehicle, no matter what the resonant speed, altering the mass of the wheel to neutralize the detected static unbalance, repeating the detecting operation and generating electrical signals in synchronism with horizontal vibrations of the wheel supporting structure to locate the locus of dynamic unbalance, and altering the mass of the wheel to neutralize the detected dynamic unbalance.

4. A method of detecting the angular locus of static and dynamic unbalance of a vehicle wheel rotatably supported on an axle of the vehicle and forming therewith an elastic, damped vibrational system wherein the displacement caused by the unbalance lags the locus of mass by 90 degrees at the resonant speed of the system, comprising placing a characteristic mark on the wheel, freeing the wheel for rotation, rotating the wheel at a speed in excess of the resonant speed, freely decelerating the wheel at least to said resonant speed, generating electrical signals in synchronism with radial vibrations of the wheel supporting structure, periodically illuminating the wheel at a predetermined cyclic point of the signals, observing the apparent fixed position of the mark at the resonant speed of the wheel, stopping the wheel and returning said mark to its apparent fixed position, thereby to locate the locus of static unbalance at the same position relative to the vehicle, no matter what the resonant speed, altering the mass of the wheel to neutralize the detected static unbalance, repeating the detecting operation and generating electrical signals in synchronism with axial vibrations of the wheel supporting structure to locate the locus of dynamic unbalance, and altering the mass of the wheel to neutralize the detected dynamic unbalance.

5. Apparatus for balancing vehicle wheels while journaled by the vehicle and supported in a manner to rotate freely, in combination, means for freely rotating the wheel at a speed productive of resonance in the vibratory system including the wheel, means including an electromagnetic pickup having a pair of windings and an armature, said armature having a portion for contacting a part of the vehicle structure journalling the wheel, whereby similar alternating-current voltages are generated in said windings synchronous with the vibrations of said associated wheel structure produced by unbalanced conditions of said freely rotating wheel, a stroboscopic device comprising a light source, electric means having connection with one of said windings and with said stroboscopic device for shaping the alternating-current voltage received from said winding whereby to cause the stroboscopic device to flash synchronously with the vibrations, said electric means including means for flashing the stroboscopic device at a definite point in the rotative cycle of the wheel at the speed of rotation of said wheel productive of resonance in the vibratory system including said wheel, and a current measuring instrument electrically connected to the other winding.

6. Apparatus for balancing vehicle wheels while journaled on the vehicle and supported for free rotation, including in combination, means for rotating the wheel at a speed productive of resonance in the vibratory system including the wheel, an electromagnetic pickup for generating a signal voltage synchronous with vibrations of the wheel supporting structure induced by an unbalance of the freely rotating wheel, a stroboscopic device, electric means connected between the pickup and stroboscopic device for periodically flashing the device in synchronism with said vibrations, and phasing means connected between said electric means and the electromagnetic pickup for maintaining a substantially constant phase relation between the generated voltage and the voltage operating on the stroboscopic device for all frequencies within the range of resonant speeds of vehicle wheels.

7. Apparatus for balancing vehicle wheels while journaled on the vehicle and supported for free rotation, including in combination, means for rotating the wheel at a speed productive of resonance in the vibratory system including the wheel, electromagnetic pickup means for generating an alternating current signal voltage synchronous with vibrations of the wheel supporting structure induced by an unbalance of the freely rotating wheel and having a portion adapted to be placed in contact with a portion of the wheel supporting structure, a stroboscopic device, and electric means connected between the pickup and stroboscopic device for periodically flashing the device in synchronism with said vibrations and when the locus of the unbalance is in a plane passing through the axis of rotation of the wheel and the said portion of the pickup means, said electric means including an amplifier and signal voltage phase shifting means connected between the pickup and amplifier adapted to maintain a substantially constant phase relation between the generated voltage and the voltage operating on the stroboscopic device for all frequencies within the range of resonant speeds of vehicle wheels.

8. A method of detecting the angular locus of the unbalanced portion of a vehicle wheel rotatably supported on an axle of the vehicle and forming therewith an elastic, damped vibrational system wherein the displacement caused by the unbalance lags the locus of mass by 90 degrees at the resonant speed of the system, comprising noting a characteristic mark on the wheel, supporting the vehicle to free the wheel for rotation, rotating the wheel at resonant speed, producing signals in synchronism with said vibrations, operating a stroboscopic device at a predetermined cyclic point of the signals, observing the apparent fixed position of the mark at the resonant speed of the vehicle, stopping the wheel and returning said mark to its apparent fixed position, thereby to locate the locus of unbalance at the same position relative to the vehicle, no matter what the resonant speed.

9. Apparatus for detecting unbalance in a vehicle wheel mounted for free rotation relative to its supporting structure on the vehicle, including in combination, means for freely rotating the wheel at the resonant speed of the wheel and its supporting structure, a translating device for generating a signal voltage in response to vibrations of the wheel supporting structure, an amplifier for amplifying the signal voltage, a stroboscopic lamp periodically fired in response to the amplified voltage, and phase shifting means interposed between the translating device and amplifier, said phase shifting means being constructed and arranged to produce a substantially constant phase shift for different resonant speeds in the range of resonant speeds of vehicles for which the apparatus is designed.

10. Apparatus for detecting unbalance in a vehicle wheel mounted for free rotation relative to its supporting structure on the vehicle, of the type wherein means are provided for freely rotating the wheel, a translating device generates a signal voltage in response to vibrations of the wheel supporting structure, an amplifier amplifies the voltage, and a stroboscopic lamp is periodically fired in response to the amplified voltage, characterized by the fact that phase shifting means are interposed between the translating device and the amplifier, said phase shifting means being constructed and arranged to produce a substantially constant phase shift for different resonant speeds in the range of resonant speeds of vehicles for which the apparatus is designed.

11. Apparatus for detecting unbalance in a vehicle wheel mounted for free rotation relative to its supporting structure on the vehicle, of the type wherein means are provided for freely rotating the wheel at the resonant speed of the wheel and its supporting structure, a translating device generates a signal voltage in response to vibrations of the wheel supporting structure, an amplifier amplifies the voltage, and a stroboscopic lamp is periodically fired in response to the amplified voltage, characterized by the fact that phase shifting means are interposed between the translating device and the amplifier, said phase shifting means including a series resistor and a condenser connected across the input circuit of the amplifier, said resistor having a relatively high resistance and said condenser having a relatively small capacitance thereby to produce a substantially constant phase shift for different resonant speeds in the range of resonant speeds of vehicles for which the apparatus is designed.

12. A method of detecting the angular locus of static and dynamic unbalance of a vehicle wheel rotatably supported on an axle of the vehicle to form a vibrational system wherein the displacement caused by the unbalance lags the locus of mass by 90 degrees at the resonant speed of the system, comprising the steps of freeing the wheel for rotation, noting a characteristic mark on the wheel, rotating the wheel at resonant speed, generating electrical signals in synchronism with horizontal vibrations of the wheel structure, operating a stroboscopic device at a predetermined cyclic point of the signals, observing the apparent fixed position of the mark at the resonant speed of the wheel, stopping the wheel and returning said mark to its apparent fixed position thereby to locate the locus of dynamic unbalance at the same position relative to the vehicle no matter what the resonant speed, repeating the detecting operation and generating electrical signals in synchronism with vertical vibrations of the wheel structure to locate the locus of static unbalance.

MARCELLUS S. MERRILL.
CLAUDE M. HATHAWAY.